United States Patent
Brandys et al.

(10) Patent No.: US 6,506,494 B2
(45) Date of Patent: Jan. 14, 2003

(54) AMBIENT-TEMPERATURE-STABLE, ONE-PART CURABLE EPOXY ADHESIVE

(75) Inventors: Frank A. Brandys, London (CA); Michael J. Irwin, London (CA); Kent S. Tarbutton, Lake Elmo, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 10/010,690

(22) Filed: Nov. 9, 2001

(65) Prior Publication Data

US 2002/0076566 A1 Jun. 20, 2002

Related U.S. Application Data

(63) Continuation of application No. 09/467,855, filed on Dec. 20, 1999, now abandoned.

(51) Int. Cl.$^7$ .................... B32B 9/04; B32B 27/38; B32B 27/04; C08J 7/18; C08K 9/00
(52) U.S. Cl. .................... 428/402.2; 428/402.21; 428/402.22; 428/402.24; 428/413; 428/414; 428/416; 427/487; 442/150; 523/206; 523/211
(58) Field of Search ................... 523/206, 211; 428/458, 413, 416, 414, 402.2, 402.21, 402.22, 402.24; 427/487; 442/150

(56) References Cited

U.S. PATENT DOCUMENTS

| | | | |
|---|---|---|---|
| 3,496,250 A | 2/1970 | Czerwinski | 156/310 |
| 3,553,166 A | 1/1971 | Anderson et al. | 502/159 |
| 3,664,963 A | 5/1972 | Pasin | 548/101 |
| 3,792,016 A | 2/1974 | Hill et al. | 528/109 |
| 3,819,560 A | 6/1974 | Kehr | 523/206 |
| 4,101,514 A | 7/1978 | Thom | 528/92 |
| 4,105,667 A | 8/1978 | Thom | 427/213.36 |
| 4,225,460 A | 9/1980 | Newell | 526/122 |
| 4,332,713 A | 6/1982 | Lehmann | 156/328 |
| 4,756,787 A | 7/1988 | Drain et al. | 525/65 |
| 4,772,645 A | 9/1988 | Tarbutton et al. | 523/457 |
| 4,940,852 A | 7/1990 | Chernack | 523/211 |
| 4,948,449 A | 8/1990 | Tarbutton et al. | 156/307.3 |
| 4,959,398 A | 9/1990 | Oka et al. | 523/400 |
| 4,970,307 A | 11/1990 | Takeda et al. | 540/579 |
| 5,057,353 A | 10/1991 | Maranci et al. | 428/147 |
| 5,120,823 A | 6/1992 | Boyd | 528/310 |
| 5,234,757 A | 8/1993 | Wong | 428/311.1 |
| 5,242,748 A | 9/1993 | Folda et al. | 428/272 |
| 5,248,550 A | 9/1993 | Turpin et al. | 428/278 |
| 5,290,857 A | 3/1994 | Ashida et al. | 525/65 |
| 5,310,825 A | 5/1994 | Babayan et al. | 525/423 |
| 5,401,812 A | 3/1995 | Yamamoto et al. | 525/426 |
| 5,453,453 A | 9/1995 | Lamon et al. | 521/54 |
| 5,464,902 A | 11/1995 | Recker | 525/119 |
| 5,601,761 A | 2/1997 | Hoffman et al. | 264/4.3 |
| 5,605,745 A | 2/1997 | Recker et al. | 442/175 |
| 5,627,222 A | 5/1997 | Recker et al. | 523/400 |
| 5,660,901 A | 8/1997 | Wong | 428/35.7 |
| 5,712,039 A | 1/1998 | Marhevka et al. | 428/414 |
| 5,726,222 A | 3/1998 | Sawaoka et al. | 523/211 |
| 5,739,217 A | 4/1998 | Hagiwara et al. | 525/476 |
| 5,837,355 A | 11/1998 | Hayai | 428/209 |
| 5,939,473 A | 8/1999 | Hirano et al. | 523/443 |
| 6,063,839 A | 8/2000 | Oosedo et al. | 523/206 |

FOREIGN PATENT DOCUMENTS

| | | |
|---|---|---|
| EP | 0 124 808 | 12/1984 |
| EP | 0152209 | 8/1985 |
| EP | 0 289 632 | 11/1988 |
| EP | 0672707 | 9/1995 |
| JP | 5-311047 | 11/1993 |
| JP | 6-69257 | 3/1994 |
| JP | 6-126153 | 5/1994 |
| JP | 6-128545 | 5/1994 |
| JP | 6-145420 | 5/1994 |
| JP | 6-184283 | 7/1994 |
| JP | 7-53925 | 2/1995 |
| JP | 7-292218 | 11/1995 |
| JP | 08-100163 | 4/1996 |
| JP | 8-239452 | 9/1996 |
| JP | 8-283383 | 10/1996 |
| JP | 9-165435 | 6/1997 |
| JP | 10-27521 | 1/1998 |
| JP | 10-67919 | 3/1998 |
| JP | 10-101773 | 4/1998 |
| JP | 10-168163 | 6/1998 |
| JP | 10-182949 | 7/1998 |
| JP | 10-189832 | 7/1998 |
| JP | 10-219222 | 8/1998 |
| JP | 10-287848 | 10/1998 |
| WO | WO 91/02038 | 2/1991 |

OTHER PUBLICATIONS

Encyclopedia of Polymer Science and Technology, 6, p. 322 (1986).
Jarvis et al., *Acta Crystallogr.*, vol. 13, 1027, 1960.
Inoue et al., *J. Coord. Chem.*, vol. 6, 157, 1977.

*Primary Examiner*—Paul Thibodeau
*Assistant Examiner*—Monique R. Jackson
(74) *Attorney, Agent, or Firm*—Douglas B. Little; Harold C. Knecht

(57) ABSTRACT

A one-part curable epoxy adhesive composition is provided. The adhesive comprises curable epoxy resin, a latent curative system comprising (a) at least one first curative encapsulated in thermoplastic polymeric microcapsules and (b) a second latent curative admixed in the curable epoxy resin, and sufficient particulate thermoplastic polymeric material to at least partially regionally plasticize the cured epoxy resin wherein up to all of the particulate thermoplastic polymeric material may be provided by the walls of the microcapsules. A method of curing the adhesive by heating the composition is also provided. A joint made by adhering members together with the adhesive composition and a method of making the joint are also provided.

24 Claims, No Drawings

AMBIENT-TEMPERATURE-STABLE, ONE-PART CURABLE EPOXY ADHESIVE

CROSS REFERENCE TO RELATED APPLICATIONS

This application is a continuation of U.S. application Ser. No. 09/467,855, filed Dec. 20, 1999, now abandoned.

BACKGROUND OF THE INVENTION

1. Field of the Invention

The present invention relates to ambient-temperature-stable, one-part curable epoxy adhesive compositions, a method of curing the adhesive, a joint made with the cured adhesive and a method of making the joint.

2. Description of Related Art

Ambient-temperature-stable, one-part curable epoxy adhesive compositions that have a long shelf life over a broad range of storage conditions have long been the goal of the manufacturers of such products. Typically, storage conditions for such products would include temperatures which may range from well below 0° C. to 50° C. or higher.

Previous storage-stable, one-part, curable epoxy resin systems generally comprise two or more reactive or reaction-producing components stored in an intimately admixed, unreactive or slowly reactive state which, ideally, react rapidly when subjected to a suitable stimulus, such as application of heat or mechanical shear. Various attempts have been made to prepare one-part systems by utilizing as curatives latent chemical compounds which are stable at room temperature but will produce reactive curative material when heated to an appropriate temperature. Similarly, reactive curing agents and/or catalysts have been encapsulated into microcapsules typically having walls made of a polymeric material that is thermoset or cross-linked and, thus, are unaffected by heating but instead rely on shear forces to release the curing agent and/or catalyst to initiate the curing of the epoxy system.

Curable epoxy systems which contain curatives encapsulated in microcapsules having shell walls comprised of thermoplastic materials are known but the amount of the thermoplastic material in these compositions is generally limited to that just sufficient to provide a barrier between the curative and the curable epoxy systems and generally such amounts will have little or no effect in changing the physical properties of the resultant cured epoxy resin.

Curable epoxy systems which contain non-encapsulated curatives and thermoplastic particles are also known but such systems are not as storage stable as would be desired.

The use of engineering thermoplastic particulate to improve impact tolerance and delaminating resistance in composites is also known in the art as is the use of core-shell materials for use as tougheners in curable polymer.

A need exists for an ambient-temperature-stable, one-part curable epoxy adhesive composition which has excellent storage-stability under any of a wide variety of storage conditions, yet is easily cured by application of heat to produce a cured epoxy resin having excellent physical properties.

SUMMARY OF THE INVENTION

The present invention provides an ambient-temperature-stable, one-part curable epoxy adhesive composition which has excellent storage-stability under any of a wide variety of storage conditions, yet is easily cured by application of heat to produce a cured epoxy resin having excellent physical properties, including in some compositions a reduced modulus which makes it prone to cohesive failure which is desired in some applications. Compositions of the invention are useful in structural adhesive applications, either alone or in conjunction with conventional fastening techniques such as welding and/or mechanical fastening. The curable composition may be formed into sheets which provide a convenient way of introducing the adhesive composition between structural members to make a bonded joint. Preferred cured compositions according to the invention will fail cohesively before failing adhesively when adhered to a substrate.

Specifically, the present invention provides a one-part curable epoxy composition comprising a mixture of A. epoxy resin capable of being cured to a cured epoxy resin when exposed to an activated latent curative system;

B. a latent curative system in an amount sufficient to cure said epoxy resin comprising (a) at least one epoxy-resin-miscible first curative contained substantially as a core within a multiplicity of ambient-temperature-stable, impermeable microcapsules having capsule walls comprised of a thermoplastic polymeric material and (b) at least one epoxy resin latent second curative admixed uniformly within said curable epoxy resin; and C. sufficient particulate thermoplastic polymeric material having a melt flow temperature that exceeds ambient temperature and the ability to be at least partially melt blended into the epoxy resin to at least regionally plasticize the cured epoxy resin, wherein up to all of the total weight of the particulate thermoplastic polymeric material may be provided by the thermoplastic polymeric material of the capsule walls.

A preferred first curative comprises a solid epoxy resin hardener contained substantially as a core within the capsule walls of the microcapsules, and most preferably the curative also comprises a latent accelerator as the second curative which is not contained within the capsule walls with the first curative but may be contained in separate thermoplastic microcapsules.

The first curatives for use in curable compositions of this invention preferably are relatively non-acidic curing agents such as acid anhydrides of carboxylic acids, compounds containing the hydrazine function ($-CO-NH-NH_2$) or an epoxide-curing derivative thereof, diaminediarylsulfones, and dicyandiamide compounds including analogs of dicyandiamide which are disclosed in Anderson et al. (U.S. Pat. No. 3,553,166), the disclosure of which is incorporated herein by reference.

Imidazoles or imidazole containing compounds, hereinafter termed "imidazoles" or "imidazolates," are preferably present in the curable composition as the second curative together with the first curative in catalytic amounts, i.e., in amounts sufficient to catalyze the reaction between the epoxide resin, the hardeners, and other reactive materials with the epoxide resin on heating of the composition. Metal imidazolate curative materials and their derivatives are disclosed in Hill et al. (U.S. Pat. No. 3,792,016), the disclosure of which is incorporated by reference. Preferably, the amount of the imidazolate used is about 0.1 to about 10 weight percent, more preferably about 0.5 to about 3 weight percent based on the epoxide equivalent weight. Preferably, the imidazolate is a solid which is insoluble at the storage and processing temperatures in the epoxide resin to provide increased storage stability.

The imidazoles and imidazolates useful in the practice of the invention include imidazole compounds having a counter ion to balance the charge in the molecule. A suitable imidazolate is a metal imidazolate compound of the formula:

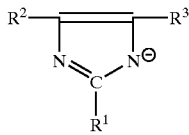

wherein M is a metal selected from the group of Ag(I), Cu(I), Cu(II), Cd(II), Zn(II), Hg(II), Ni(II) and Co(II), and L is an imidazolate of the formula $$R^2 - \underset{\underset{R^1}{C}}{\overset{}{N}} = \underset{}{N^{\ominus}} - R^3$$

wherein $R^1$, $R^2$, and $R^3$ are selected from a hydrogen atom, an alkyl radical or aryl radical and m is the valence of M.

An example of a suitable imidazole is diphenyl imidazole.

The most preferred metal imidazolate compound is a green colored copper (II) imidazolate made as described herein.

The compositions according to the invention include sufficient thermoplastic polymeric material in particulate form to improve physical properties of the cured composition. Additionally, the thermoplastic polymeric materials may be entirely provided by the thermoplastic material which provides capsule walls which enclose other reactive components of the epoxy resin. Materials that may be encapsulated by the thermoplastic material include an epoxy hardener and/or accelerator, and other reactive materials, such as catechol, that in the absence of encapsulation may prematurely cause the epoxy resin to harden.

The thermoplastic polymeric material from the capsule walls and, if present, the particulate material, is contained in the composition in an amount based on the total weight of the cured composition, such that, after melt blending the thermoplastic material with the composition during curing, the epoxy composition is at least partially regionally plasticized and toughened. Plasticization is readily apparent in that the cured epoxy composition has at least areas having a reduced modulus when compared to the composition without the thermoplastic material. The modulus reduction is preferably sufficient to cause the cured adhesive composition to fail cohesively rather than adhesively when it is adhered to a substrate. Additionally, in preferred compositions of the invention, the presence of the thermoplastic material in the composition may increase the strength of the bond to certain substrates as evidenced by increased peel adhesion values. Typical amounts of thermoplastic material may range from about 0.5% to about 30% by weight of thermoplastic polymeric material based on the total weight of the epoxy adhesive composition, preferably about 1% to about 20%, more preferably about 2% to about 15% by weight and most preferably about 2% to about 10% by weight.

The invention further provides a method of making a cured epoxy composition comprising the steps of A. providing a one-part curable epoxy composition comprising (a) epoxy resin capable of being cured to a cured epoxy resin when exposed to an activated latent curative system; (b) a latent curative system in an amount sufficient to cure said epoxy resin comprising (i) at least one epoxy-resin-miscible first curative contained substantially as a core within a multiplicity of ambient-temperature-stable, impermeable microcapsules having capsule walls comprised of a thermoplastic polymeric material and (ii) at least one epoxy resin latent second curative admixed uniformly within said curable epoxy resin; and; (c) sufficient particulate thermoplastic polymeric material having a melt flow temperature that exceeds ambient temperature and the ability to be at least partially melt blended into the epoxy resin to at least regionally plasticize the cured epoxy resin, wherein up to all of the total weight of said particulate thermoplastic polymeric material may be provided by the thermoplastic polymeric material of said capsule walls; and B. heating said mixture at least to the melt flow temperature of said polymeric material.

Additionally, the present invention provides a one-part curable epoxy composition comprising a mixture of A. epoxy resin capable of being cured to a cured epoxy resin when exposed to an activated latent curative system; and B. a latent curative system in an amount sufficient to cure the epoxy resin comprising (a) at least one epoxy-resin-miscible first curative contained substantially as a core within a multiplicity of ambient-temperature-stable, impermeable microcapsules having capsule walls comprised of a thermoplastic polymeric material and (b) at least one epoxy resin latent second curative admixed uniformly within said curable epoxy resin; wherein the thermoplastic capsule walls isolate the first curative from the second curative.

The compositions described above may be stored in bulk containers for use with conventional dispensing systems which may heat the composition to a flowable consistency. The dispensing system preferably has the ability to force a segment of the composition from a dispensing nozzle, or to form the composition into a sheet which may be cut into strips and rolled for convenient dispensing by purchasers of such rolls. Such dispensing devices are well known by those skilled in the art, as are the methods of forming sheets of such compositions and as are methods of cutting the sheets into strips and rolling the strips onto suitable cores to provide rolls.

The compositions according to the invention are especially suited for use in adhering abutting members together, either by use of the cured composition alone or together with other mechanical means of fastening such as welding, bolting, riveting, sheet metal screw fastening, etc. The joint typically includes two abutting members, one having a surface which is in contact with a surface on the other wherein a quantity of the composition of the invention may be interposed therebetween. A typical place where such joints are found is in the assembly of automotive parts into an automobile. A joint is formed by holding the members together in a desired position while heating the curable composition to the melt flow temperature of the polymeric material to cause the microcapsules to open and release the first curative into the reactive epoxy resin while simultaneously activating the heat activatable latent second curative such as the metal imidazolate latent catalyst. The resulting cured epoxy resin will be characterized by including melt blended therein the thermoplastic material including that which formerly provided the capsule walls to thereby provide changes in physical properties in the cured epoxy resin. The changed physical properties of the cured epoxy resin include a multitude of plasticized particulate/epoxy resin interfaces or plasticized domains with a lower modulus than the non-plasticized or less plasticized domains, as compared to the same cured composition which does not have the thermoplastic material added solid particulate or capsule walls discretely contained therein. The curable adhesive of the invention is typically applied from a dispensing device to at least a portion of one surface of at least one member to be adhered to a surface of another member. Some heating may be required to provide a consistency of the curable adhesive such that it will flow under pressure. The adhesive is typically tacky and it will immediately adhere to the surface to which it is applied. The adhesive may also conveniently be applied as a sheet or strip.

The applied curable epoxy composition is quite useful in adhering together members for forming parts of automobiles during their production because it affords excellent flowability under pressure when the parts are being held together in a welding operation and may be welded through to provide a joint between such members which is both spot welded and adhered by the cured epoxy resin composition.

For the purposes of this invention, the following terms used herein will have the meanings designated below:

"one-part curable epoxy composition" shall mean an integral composition which contains curable epoxy resin and other components at least one of which is a first curative which is encapsulated for release upon activation by heat and at least another of which is a heat-activatable latent second curative.

"ambient-temperature-stable" with respect to the polymeric material forming the microcapsule wall shall mean that the microcapsules are stable under any of a wide variety of storage conditions which may range from −20° C. or lower up to and including any elevated temperatures required for processing the curable composition, e.g., to form sheets.

"impermeable" with respect to the microcapsule wall shall mean the capsule wall acts as a barrier between the curable epoxy resin and any curative contained therein under ambient temperature conditions.

"melt flow temperature" shall mean the temperature at which the thermoplastic polymeric material forming the capsule walls and the added particulate thermoplastic material first undergoes sufficient flow to permit interaction of the encapsulated curative and reactive epoxy resin to facilitate curing of the reactive epoxy resin and melt blending the thermoplastic particles and capsule walls into the epoxy resin.

"melt blended" with respect to the disposition of the thermoplastic polymeric material which formed the microcapsule walls, and that of any added particulate material, after achieving the melt flow temperature shall mean that such material will be distributed throughout the cured epoxy resin in a blend which may vary from being fairly homogeneous to being in isolated discrete phases within the cured epoxy resin.

"miscible" shall mean with respect to the interaction of the first curative to the epoxy resin shall mean that the first curative at the melt flow temperature is sufficiently dispersed within the reactive epoxy resin to facilitate complete curing of the epoxy resin.

"solid" with respect to the physical condition of the epoxy resin hardener shall mean the hardener is a solid material, i.e., neither gaseous nor liquid under ambient temperature conditions.

"latent curative" shall mean an epoxy curative that has been rendered temporarily inactive so that it will not, under storage and processing conditions, cause curing of epoxy resin due to its being stabilized by chemical reaction to produce a chemical complex, being encapsulated within a material that provides a physical barrier (e.g., a thermoplastic polymer shell), or being inherently immiscibility and/or non-reactive.

"curative" shall mean a compound that will initiate the curing of an epoxy resin, such as a hardener or accelerator.

"hardener" shall mean a curative having multiple functionality capable of cross linking the epoxy resin.

"accelerator" shall mean a curative that promotes the rapid cure of the epoxy resin either alone or in combination with the hardener.

"particulate thermoplastic" shall mean a solid thermoplastic particle that is not miscible at ambient temperatures in the reactive epoxy resin, which may take any shape such as a homogeneous sphere or microcapsule wall.

"plasticize" shall mean impart flexibility and toughness to at least a portion of the cured epoxy resin.

"regionally plasticize" shall mean to plasticize in zones around a site and/or former site of individual thermoplastic particles in a cured epoxy resin.

DETAILED DESCRIPTION

The curable one-part systems formulated according to this invention typically contain (1) a suitable aliphatic, cycloaliphatic, aromatic, or heterocyclic curable epoxide, (2) at least one first curative which is encapsulated in a thermoplastic polymeric material and which may be a solid epoxy resin hardener, (3) at least one latent second curative which may be an epoxy resin accelerator, wherein the curatives are included in an amount that will cure the epoxy resin, (4) thermoplastic material, as particles and shell walls and, optionally, (5) suitable tougheners, fillers, extenders, flexibilizers, or pigments including vinyl or olefinic or acrylic polymers, colloidal silica, finely divided inorganic salts, etc.

The epoxy resins or epoxides that are useful in the composition of the present invention may be any organic compound having at least one oxirane ring that is polymerizable by ring opening, i.e., an average epoxy functionality greater than one, and preferably at least two. The epoxides can be monomeric or polymeric, and aliphatic, cycloaliphatic, heterocyclic, aromatic, hydrogenated, or mixtures thereof. Preferred epoxides contain more than 1.5 epoxy group per molecule and preferably at least 2 epoxy groups per molecule. The useful materials typically have a weight average molecular weight of about 150 to about 10,000, and more typically of about 180 to about 1,000. The molecular weight of the epoxy resin is usually selected to provide the desired properties of the cured adhesive.

Suitable epoxy resins include linear polymeric epoxides having terminal epoxy groups (e.g., a diglycidyl ether of a polyoxyalkylene glycol), polymeric epoxides having skeletal epoxy groups (e.g., polybutadiene polyepoxy), and polymeric epoxides having pendant epoxy groups (e.g., a glycidyl methacrylate polymer or copolymer), and mixtures thereof. The epoxide-containing materials include compounds having the general formula:

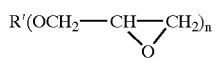

wherein: R' is alkyl, alkyl ether, or aryl, and n is an integer between 2 and 6.

These epoxy resins include aromatic glycidyl ethers, e.g., such as those prepared by reacting a polyhydric phenol with an excess of epichlorohydrin, cycloaliphatic glycidyl ethers, hydrogenated glycidyl ethers, and mixtures thereof. Such polyhydric phenols may include resorcinol, catechol, hydroquinone, and the polynuclear phenols such as p,p'-dihydroxydibenzyl, p,p'-dihydroxydiphenyl, p,p'-dihydroxyphenyl sulfone, p,p'-dihydroxybenzophenone, 2,2'-dihydroxy-1,1-dinaphthylmethane, and the 2,2', 2,3', 2,4', 3,3', 3,4', and 4,4' isomers of dihydroxydiphenylmethane, dihydroxydiphenyldimethylmethane, dihydroxydiphenylethylmethylmethane, dihydroxydiphenylmethylpropylmethane, dihydroxydiphenylethylphenylmethane, dihydroxydiphenylpropylphenylmethane, dihydroxydiphenylbutylphenylmethane, dihydroxydiphenyltolylethane, dihydroxydiphenyltolylmethylmethane, dihydroxydiphenyldicyclohexylmethane, and dihydroxydiphenylcyclohexane. Also useful are polyhydric phenolic formaldehyde condensation products as well as polyglycidyl ethers that contain as reactive groups only epoxy groups or hydroxy groups.

Useful curable epoxy resins are also described in various publications including, for example, "Handbook of Epoxy Resins" by Lee and Nevill, McGraw-Hill Book Co., New York (1967), and Encyclopedia of Polymer Science and Technology, 6, p.322 (1986).

The choice of the epoxy resin used depends upon the end use for which it is intended. Epoxides with flexibilized backbones may be desired where a greater amount of ductility is needed in the bond line. Materials such as diglycidyl ethers of bisphenol A and diglycidyl ethers of bisphenol F can provide desirable structural adhesive properties that these materials attain upon curing, while hydrogenated versions of these epoxies may be useful for compatibility with substrates having oily surfaces.

Examples of commercially available epoxides useful in the invention include diglycidyl ethers of bisphenol A (e.g., those available under the tradenames Epon™ 828, Epon™ 1001, Epon™ 1004, Epon™ 2004, Epon™ 1510, and Epon™ 1310 from Shell Chemical Co., and those under the tradenames DER™-331, DER™-332, DER™-334, and DEN™-439 available from Dow Chemical Co.); diglycidyl ethers of bisphenol F (e.g., that available under the tradename Epiclon™ 830 available from DaiNippon Ink and Chemicals, Inc.); silicone resins containing diglycidyl epoxy functionality; flame retardant epoxy resins (e.g., that available under the tradename DER 580, a brominated bisphenol type epoxy resin available from Dow Chemical Co.); 1,4-butanediol diglycidyl ethers, and the ERL™ series of resins available from Union Carbide, such as 3,4-epoxycyclohexylmethyl-3,4-epoxycyclohexanecarboxylate, bis-(3,4-epoxycyclohexyl) adipate, and 2-(3,4-epoxycyclohexyl-5,5-spiro-3,4-epoxy) cyclohexene-meta-dioxane.

Epoxy containing compounds having at least one glycidyl ether terminal portion, and preferably, a saturated or unsaturated cyclic backbone may optionally be added to the composition as reactive diluents. Reactive diluents may be added for various purposes such as to aid in processing, e.g., to control the viscosity in the composition as well as during curing, to flexibilize the cured composition, and to compatibilize materials in the composition. Examples of such diluents include: diglycidyl ether of cyclohexane dimethanol, diglycidyl ether of resorcinol, p-tert-butyl phenyl glycidyl ether, cresyl glycidyl ether, diglycidyl ether of neopentyl glycol, triglycidyl ether of trimethylolethane, triglycidyl ether of trimethylolpropane, triglycidyl p-amino phenol, N,N'-diglycidylaniline, N,N,N',N',-tetraglycidyl meta-xylylene diamine, and vegetable oil polyglycidyl ether. Reactive diluents are commercially available under the trade name Heloxy™ 107 from Shell Chemical Co.

The epoxy equivalent weight (EEW) is a term that will be used to specify relative quantities of certain components in the composition of the invention. The EEW is the weight of the epoxy resin in grams which contains one gram chemical equivalent of epoxide, i.e., the average molecular weight of the epoxy resin, divided by the average number of reactive sites on the molecule. The epoxy equivalents for an epoxy resin is calculated by dividing the amount of the epoxy resin by the EEW for that epoxy resin. If other materials are included in the composition that react with the epoxide, such as for example, catechol, the equivalents for those materials are included in the accelerator and hardener equivalents.

Likewise, the equivalent weight of the hardener and accelerator is calculated by dividing their respective molecular weights by the number of reactive sites on the molecule, and the curative equivalents is calculated by dividing the amount of hardener and/or accelerator by their respective equivalent weights.

In the practice of the invention, it is preferred that the equivalents ratio of curative equivalents including hardener(s) and/or accelerator(s), e.g., the dicyandiamide and metal imidazolate, to the equivalents of the reactive species in the formulation, e.g., epoxy and catechol, is on the order of about 0.3 to 1.3, and more preferably on the order of about 0.5 to about 1.2.

The thermoplastic polymeric materials useful in the practice of the present invention are solid at room temperature and exhibit flow at approximately the temperature at which the epoxy composition is cured. Suitable thermoplastic polymeric materials typically have a weight average molecular weight of greater than about 7000. If the thermoplastic material is present as the capsule wall, the weight average molecular weight will typically vary from about 7000 to about 350,000, preferably from 12,000 to about 350,000, and most preferably about 12,000 to about 70,000. The weight average molecular weight is selected to provide capsule walls having sufficient integrity to surround the core material and protect it from reacting with other materials in the epoxy adhesive composition at the processing temperatures needed to make the adhesive of the invention and to process it to make products such as a film of the adhesive, but will still exhibit sufficient flow at the cure temperature to release the core material so that it may harden the composition. Preferably, the thermoplastic material will flow and at least partially diffuse into the epoxy at the cure temperature and release the core material so that it may harden the composition to provide regional plasticization resulting from the presence of the preferred thermoplastic material. In an alternative preferred embodiment, the thermoplastic material encapsulates a first epoxy curative to isolate or protect it from a second epoxy curative that is dispersed in the epoxy composition. The second epoxy curative is preferably latent at temperatures below the curing temperature of the epoxy. Suitable thermoplastic polymeric materials are also characterized by having a typical glass transition temperature ($T_g$) above about 60° C., preferably above about 70° C., and most preferably at least 100° C.

The thermoplastic materials are used in amounts of from about 0.5 to about 30 percent by weight based on the total weight of the epoxy adhesive composition, preferably from about 1 to 20 percent, and more preferably from about 1 to about 10 percent by weight of the epoxy composition.

A preferred class of thermoplastic materials includes acrylic polymers and copolymers, and a more preferred class are polymers and copolymers of methyl methacrylate. Examples of preferred thermoplastic materials include polymethylmethacrylate having a weight average molecular weight of about 15,000 and a $T_g$ of about 110° C., polymethylmethacrylate/methacrylic acid copolymer having a weight average molecular weight of about 34,000 and a number average molecular weight of about 15,000 and a mole ratio of methylmethacrylate to methacrylic acid of about 1:0.16, and polybutylmethacrylate/methacrylate copolymer having a weight average molecular weight of about 100,000 and a $T_g$ of about 115° C. and a mole ratio of butylmethacrylate to methyl methacrylate of 1.4:1.

The thermoplastic materials are typically added as particulates to an epoxy adhesive composition at a temperature of at least about 5° C. below the $T_g$ of the thermoplastic material, preferably at least about 10° C., and most preferably at least about 15° C. below the $T_g$ of the thermoplastic material. The particulate materials may be powder-like, typically having a particle size range of about 2.5 to 250 micrometers. Where used to encapsulate the reactive components, the resultant capsules will typically have an average particle size on the order of about 2.5 to 250 micrometers, most preferably about 10 to about 30 micrometers. Particulate non-filled thermoplastic materials are typically about 50 to about 250 micrometers in size, with the minimum particle size limited only by the conventional processes used to achieve the particle. The particles may be added as a powder in addition to being formed around solid materials such as, for example adhesion promoters, curatives, and accelerators, as an encapsulated material. When added to the epoxy adhesive composition, the particles typically remain as discrete particles acting as a typical filler material. The particulate thermoplastic generally does not increase the viscosity of the uncured composition appreciably beyond that seen by the addition of a typical inorganic filler.

In a preferred embodiment, the thermoplastic material is used to encapsulate one of the reactive components used in the epoxy adhesive composition. Such components may include epoxy hardeners, epoxy accelerators, adhesion promoters, and other materials which may cause the epoxy composition to prematurely harden or cure. Preferably, the core materials are solid at room temperature and more preferably, are solid at the process temperature used to make the epoxy adhesive. Suitable encapsulating processes are well known in the art. Equipment to provide encapsulated particles are commercially available. Examples of suitable encapsulating equipment include spray dryers such as those available from Buchi Laboratory Techniques LTD, Flawil, Switzerland, (trade designation Buchi™ 190 Mini Spray Dryer with nitrogen gas purge, designed primarily for aqueous solutions) and a closed cycle solvent spray dryer (trade designation C-1 or Mobile Minor) available from Niro, Inc., Columbia, Md.

In a specific embodiment of the encapsulation process, the thermoplastic material, e.g., polymethylmethacrylate-co-methacrylic acid, is dispersed in a suitable solvent such as acetone. Particles of the core material, e.g., dicyandiamide, are added to the solution as a dispersion and fed through a Niro, Inc. C-1 spray dryer which atomizes the particles. Alternatively, a suitable solvent for dicyandiamide (e.g., methanol) can be added to the acetone/thermoplastic/dicyandiamide to form a solution or emulsion that can be processed on equipment with a spray nozzle such as the Buchi™ 190 Mini Spray Dryer.

The composition preferably contains a toughening agent to aid in providing the desired overlap shear and impact strength. Unlike the thermoplastic material components, the toughening agents are polymeric materials which may react with the epoxy resin and may be cross-linked. Suitable toughening agents include polymeric compounds having both a rubbery phase and a thermoplastic phase or compounds which are capable of forming, with the epoxide group-containing material, both a rubbery phase and a thermoplastic phase on curing. Polymers useful as toughening agents are preferably selected to inhibit cracking of the cured epoxy composition.

A preferred class of polymeric toughening agents which are capable of forming, with the epoxide group-containing material, both a rubbery phase and a thermoplastic phase on curing are carboxyl-terminated butadiene acrylonitrile compounds. Commercially available carboxyl-terminated butadiene acrylonitrile compounds include those available under the trade designations Hycar™ 1300×8, Hycar™ 1300×13, and Hycar™ 1300×17 from B. F. Goodrich.

Carboxyl-terminated butadiene acrylonitrile compounds may also be prereacted with a diglycidyl ether of bisphenol A at, for example, a ratio of 30 to 70 parts by weight of the carboxyl-terminated butadiene acrylonitrile compound to 70 to 30 parts by weight of the diglycidyl ether of bisphenol A to increase the pot-life of the composition and provide increased shear strength at high humidity. Compounds of this type are commercially available from Shell Chemical Co. under the Epon™ resin trade designation, such as, for example, Epon™ resin 58005, Epon™ resin 58006, Epon™ resin 58032, and Epon™ resin 58042.

Other preferred polymeric toughening agents are graft polymers which have both a rubbery phase and a thermoplastic phase, such as those disclosed in U.S. Pat. No. 3,496,250, the disclosure of which is incorporated herein by reference. These graft polymers have a rubbery backbone having grafted thereto thermoplastic polymer segments. Examples of such graft polymers include, for example, methacrylate/butadiene-sytrene, acrylate-methacrylate/butadiene-styrene and acrylonitrile/butadiene-styrene polymers. The rubbery backbone is preferably prepared so as to constitute from about 95 percent to about 40 percent by weight of the total graft polymer, so that the polymerized thermoplastic portion constitutes from about 5 percent to about 60 percent by weight of the graft polymer.

Further preferred polymeric toughening agents which have both a rubbery phase and a thermoplastic phase are acrylic core-shell polymers wherein the core is an acrylic polymer having a glass transition temperature below about 0° C. Such core polymers may include polybutyl acrylate or polyisooctyl acrylate in a shell comprised of an acrylic polymer having a glass transition temperature above about 25° C., such as polymethylmethacrylate. Commercially available core-shell polymers include those available under the trade designations Acryloid™ KM 323, Acryloid™ KM 330, and Paraloid™ BTA 731, from Rohm and Haas Co.

For the greatest toughening effect, both the carboxyl-terminated butadiene acrylonitrile and the core-shell polymers used in combination in the composition are preferred.

The toughening agents are preferably present in the composition in an amount of about 5 to about 40 weight percent, more preferably about 10 to about 30 weight percent, most preferably about 15 to about 25 weight percent based on the weight of the epoxide resin in the composition.

The composition preferably contains a flow control agent or thickener, to provide the desired rheological characteristics to the composition. Suitable flow control agents include fumed silicas, such as treated fumed silica, available under the trade designation Cab-O-Sil™ TS 720, and untreated fumed silica available under the trade designation Cab-O-Sil™ M5, from Cabot Corp.

The epoxy adhesive composition may also contain adhesion promoters to enhance the bond between the adhesive and the substrate. The specific type of adhesion promoter may vary depending upon the composition of the surface to which it will be adhered. Adhesion promoters that have been found to be particularly useful for surfaces coated with ionic type lubricants used to facilitate the drawing of metal stock during processing include, for example, dihydric phenolic compounds such as catechol and thiodiphenol.

The epoxy adhesive composition may also contain one or more conventional additives such as fillers, e.g., aluminum powder, carbon black, glass bubbles, talc, clay, calcium carbonate, barium sulfate, titanium dioxide, silicas, silicates, glass beads, and mica, fire retardants, antistatic materials, thermally and/or electrically conductive particles, and expanding agents including, for example, chemical blowing agents such as azodicarbonamide or expandable polymeric microspheres containing a hydrocarbon liquid, such as those sold under the trade designation Expancel™ by Expancel Inc. (Duluth, Ga.). Particulate fillers can be in the form of flakes, rods, spheres, and the like. Additives are typically added in amounts to produce the desired effect in the resulting adhesive.

The epoxy composition of the invention can be prepared by heating and mixing one or more epoxy resins at an elevated temperature typically between about 100° C. to about 180° C. to melt the resins. The resin is then cooled to about 90–150° C. and other epoxy resins, reactive diluents, and tougheners other than core-shell polymers are added under high shear mixing. If core-shell polymers are included in the composition, they are added as particles at this point and mixed, typically for up to one hour, until the particles are dispersed. Finally fillers are added and mixed to obtain a substantially homogeneous dispersion. The composition is then further cooled to below the glass transition temperature of the thermoplastic particles, typically between about 50–100° C., before the curatives, adhesion promoters, and thermoplastic particles are mixed into the epoxy composition. At this point, the epoxy composition is typically in a flowable state so that it can be poured into a suitable container for storage until it is used.

In a preferred embodiment of the invention, the curable epoxy composition is formed into a film adhesive having a thickness of about 0.05 to about 5 mm, or it may be cooled then later re-heated and formed into a film. Preferred film thicknesses are in range of about 0.2 to 2 mm and more preferably 0.3 to 1.6 mm. The film may be formed using conventional processes such as by knife coating the heated composition onto a release liner or a casting belt or by extruding the composition onto a release liner. Such operations should be carried out at temperatures below the reaction temperature of the epoxy composition, i.e., at least about 5° C., and preferably at least about 15° C., below the glass transition temperature of the thermoplastic material which forms the particles and below the reaction temperature of any curative that is not encapsulated. The heated composition may then be pumped through a die onto a release liner, curtain coated or calendared.

If the adhesive film is not self-adherent at room temperature, it may be wound into a roll without a release liner for later use. If the adhesive film is self-adherent, it may be coated directly onto a release liner or if it may be coated onto a casting belt or roll, then laminated to a release liner, and then wound into a roll for later use. Suitable release liners include papers having surfaces that do not strongly adhere to the composition such as, for example, films such as biaxially oriented polyester film, cloth, laminates such as paper and film constructions, and the like, which, if not weakly adherent to the composition, are coated with a release material so that their surfaces become weakly adherent, such as polyethylene, silicone, and fluorocarbon polymers.

The adhesive film may further include an internal support layer to facilitate handling, e.g., to inhibit excessive stretching and thinning of the film. Suitable materials for use as the internal support layer include glass fibers, polyester fibers, aramid fibers, carbon or graphite fibers, and the like, preferably in fabric form such as a woven scrim or fabric, a nonwoven scrim or fabric, or as fibers per se, if reinforcement is only needed in one direction. The support layer can be embedded into the adhesive film by coating the adhesive on one or both sides of a scrim, saturating a scrim with the adhesive, or laminating a scrim or fibers to the adhesive film. Preferably, the support layer is substantially embedded in the adhesive so that there are no exposed fiber portions that may inhibit bonding of the adhesive to a substrate. The choice of materials for the fibers depends upon the adhesive formulation and the nature of the adhesive. Preferably, the adhesive composition will wet the surface of the fibers. Suitable nonwoven fabrics are commercially available from various sources such as Technical Fibre Products, Slate Hill, N.Y. One useful fabric includes a non-woven polyester scrim having a basis weight of 0.25 oz/sq yd (8 grams/square meter). Scrims and fibers used may optionally be metallized or treated to produce desired effects such as a modified surface to enhance adhesion of the adhesive to the fibers, electrical conductivity, and/or thermal conductivity.

The adhesive films of the invention may be die cut to fit the size and shape of the substrate to be bonded. In another embodiment, the heated adhesive may be directly coated onto one of the substrates to be bonded. For example, an automotive panel may be coated with the adhesive in areas where it will contact the frame to which it will be attached. If tacky, the adhesive coated areas may be protected with a release liner. In use, the release liner is removed, and the panel is placed against the frame where it may be spot welded and exposed to sufficient heat to cure the adhesive.

The adhesives of the invention can be used to bond like and dissimilar substrates to each other in any of a variety of assembly applications. Such applications include, for example, bonding glass to metal, bonding metal to metal, bonding plastic to metal, bonding plastic to plastic, and bonding glass to glass. Certain embodiments of the invention are particularly useful for bonding metal panels to metal frames where it is desirable to spot weld through the adhesive to hold to the panel to the frame before the adhesive is fully cured.

The epoxy compositions of the invention can be formulated to cure at the times and temperatures as required by the assembly operation. For example, an adhesive may be formulated to cure in a typical paint bake cycle in an automotive assembly plant. As a specific example, a joint may be assembled with the adhesive, and the assembly is heated for 20 minutes at 164° C.

TEST METHODS

T-Peel Adhesion

This test is a measure of the bond strength at failure of 2 substrates laminated together with a test adhesive when a T deployment of the laminated substrates is pulled apart in a T-peel mode. Test coupons measuring 25 mm by 100 mm by 0.8 mm are formed from the following test substrates:

Substrate A: Hot dipped minimum spangled galvanized steel (1 mm thick obtained under trade designation G60HDMS from National Steel Corp.) that is cleaned by applying methyl ethyl ketone to the surface, wiping, and drying at ambient temperature for 10 minutes.

Substrate B: Substrate A coated with lubricant obtained under the trade designation Quaker™ 61MAL from Quaker Corp. One drop of the lubricant is dispensed at a setting of 12 µl on a precision pipette (available from Eppendorf) and smeared to an even coating over the surface to be adhered with a latex-gloved finger.

Substrate C: Substrate A coated with lubricant obtained under the trade designation FB27MC1 from Novamax Inc. Two drops of the lubricant are dispensed at a setting of 60 µl precision pipette and smeared to an even coating with a latex-gloved finger.

Substrate D: Aluminum (1 mm thick obtained under the trade designation Alcan™ 6111T4 from Alcan Aluminum Corp.) that is cleaned by applying methyl ethyl ketone to the surface, wiping, and drying at ambient temperature for 10 minutes.

Substrate E: Substrate D coated with lubricant obtained under the trade designation Parco™ MP404 from Henkel Surface Technologies. One drop of the lubricant is dispensed at a setting of 6 µl on a precision pipette and smeared to provide an even coating with a latex-gloved finger.

Substrate F: Aluminum (2 mm thick obtained under the trade designation Alcan™ 5754 PT2 coated with lubricant obtained under the trade designation A1070 from Alcan Aluminum Corp.) that is used as received from Alcan.

The test adhesive containing solid glass beads having a diameter of 0.25 mm±0.01 mm to control the bondline thickness is heated to a spreadable consistency and spread with a spatula over a release liner to form a film on cooling with a nominal thickness of 0.50±0.05 mm. In this test the supported film is cut to shape and laid onto the prepared surface of a coupon except for a 15–20 mm section at either of the ends of the coupon which are left free of adhesive. Another coupon is then placed on the adhesive directly over the first coupon, so the uncoated ends of the coupon face each other, to form an assembly. The assembly is clamped with two binder clips along each of the 100 mm edges and placed in a forced air oven at 164° C. for 20 minutes to cure the adhesive. The assembly is then conditioned at room temperature (approximately 21° C.) for at least 10 minutes before testing. The uncoated ends of the coupons are pried apart so that the assembly forms a T-shape. Opposite ends of the T are clamped into opposite jaws of an Instron™ Tensile Tester and pulled apart to bond failure at a crosshead speed of 127 mm per minute according to ASTM Method D 1876-72. T-peel adhesion test results are reported hereafter merely as "peel adhesion" test results in Newtons per centimeter (N/cm). Additionally, the mode of failure is noted as adhesive (ADH) which indicates that the adhesive has pulled cleanly away from one or both surfaces of the test coupons, cohesive (COH) which indicates that the adhesive has split apart leaving residual adhesive on both surfaces of the coupons, and mixed (MIX) which indicates that both adhesive and cohesive failure were observed.

Overlap Shear Strength

This test measures the shear strength of a test adhesive, that is, the force required to break a bond between laminated substrates as the substrates are laterally pulled apart. Test substrates of the materials described above for the T-peel Test are made into test coupons measuring 12.72 mm by 25 mm by 100 mm are used. The test adhesive is applied to two coupons and spread down to the level of glass beads contained within the adhesive except for about 15 mm at each end of the coupon. The two adhesive coated ends are pressed together with finger pressure forming a 12.72-mm overlap with the non-adhesive ends of the coupons extending in opposite directions. The overlapped coupons are clamped together using a 0.94-cm capacity binder clip. The clamped assembly is then cured in a forced air oven at 164° C. for 20 minutes. The laminate is then cooled at room temperature for at least 10 minutes. The opposite uncoated ends of the test assembly are clamped into opposite jaws of an Instron™ Tensile Tester and pulled apart to failure at a crosshead speed of 50 mm per minute according to ASTM D1002-72. Test results are reported in Newtons (N). The failure mode as described in the T-peel Test is also noted.

Rheological Measurements

The shear loss modulus of a cured epoxy adhesive is obtained using a RDAII Rheometrics™ rheometer equipped with 8 mm parallel plates. An adhesive sample is die cut to a 8 mm diameter sample size, and heated between the plates at 164° C. for 20 minutes prior to analysis. The measurements are performed starting at 164° C. and ending at 25° C., while cooling at a rate of –5° C./min while the plates were oscillated at a frequency of 1 Hz. The shear modulus is reported in Dynes/square centimeter (Dynes/cm$^2$) at 21° C.

Shunted Spot Weld Test

This test is used to determine whether or not an adhesive film can be spot welded using a shunt. A spot welder (Model LMSW-52 obtained from Miller Electric Mfg Co., Appleton, Wis.) is used. The welder specifications are 230 volts, 2.5 KVA output, 50/60 HZ single phase/ac, about 2700 Newtons pressure and set at 60 cycles.

An adhesive film is sandwiched between two 2.54× 10.16×0.13 cm coupons of galvanized steel such that the adhesive is applied to one half of the length of the coupons to form an uncured test assembly. The test assembly is placed between the tongs (5 mm copper weld tip) and pressure is applied on the section without adhesive, at approximately 1.27 cm from the start of the bondline. Current is introduced and a direct spot weld is obtained. The tongs are then placed at 1.27 cm past the bondline and over the adhesive portion of the coupons at a distance of 2.54 cm from the initial weld. Current is introduced for less than about one second (welder was turned on and then immediately turned off). The welded coupons are then pulled apart either by hand or using an Instron™ Tensile Tester. A weld is characterized as 'Good' if the welded coupons are pulled apart and substrate failure is observed, i.e., the substrate breaks, while maintaining an intact weld nugget. If the weld fails at the weld nugget, or a weld nugget is not formed, the weld is characterized as 'Poor.'

Direct Spot Welding Test

This test is used to determine whether or not an adhesive can be spot welded without using a shunt. The procedure, equipment, and test assemblies are the same as for the Shunted Spot Weld Test described above, except as follows. After the uncured test assembly is placed between the tongs (5 mm copper weld tip), pressure is applied by depressing a lever and current is introduced. As in the above procedure, a weld is characterized as 'Good' or 'Poor.'

EXAMPLES

The following examples illustrate the invention. All parts and percentages set forth in the examples are by weight, unless otherwise indicated.

Identification of Components Used in the Examples

Epon™ 828, Epon™ 1001, Epon™ 1004, Epon™ 2004, Epon™ 832 and Epon™ 836 are trade designations of the Shell Chemical Company, Houston, Tex., epoxy resins comprised of diglycidylether of bisphenol A having various degrees of chain extension.

Epon™ 58006 is the trade designation of the Shell Chemical Company for an epoxy resin adduct having 40% by weight Hycar™ 1300X8 and 60% by weight Epon™ 828.

Hycar™ 1300X13 is the trade designation of B. F. Goodrich for a carboxy-terminated acrylonitrile/butadiene rubber.

DEN™ 439 is the trade designation of Dow Chemical Co., Midland, Mich., for a multifunctional epoxy resin.

PARALOID™ EXL2600 is the trade designation of Rohm & Haas Inc. for a methacrylate/butadiene/styrene core-shell polymer.

Heloxy™ 107 is the trade designation of Shell Chemical Company for a reactive diluent comprised of diglycidyl ether of cyclohexane dimethanol.

GP-71 silica is the trade designation of Harbison-Walker Corp. for amorphous silicon dioxide having a particle size in the range of from about 20 to about 30 micrometers.

Glass bubbles refers to glass bubbles available as B37/2000 from 3M Company, Maplewood, Minn.

Glass beads refers to solid glass beads having a diameter of 0.25±0.01 mm, obtained from Cataphote, Inc., Jackson Miss.

DICY is a shorthand designation for dicyandiamide available from Aldrich Chemical, Inc., Milwaukee, Wis.

PMMA-co-MAA refers to poly(methyl methacrylate-co-methacrylic acid) having a weight average molecular weight of 34,000 and mole ratio of MMA to MAA of 1.0:0.16, obtained from Aldrich Chemical Company, Inc.

PMMA (38K) refers to polymethylmethacrylate having a weight average molecular weight of 38,000 obtained from Acros Organics, Fairlawn, N.J.

$CuSO_4$ x-hydrate refers to $CuSO_4$ obtained from Aldrich Chemical Company, Inc. which is 98% by weight $CuSO_4$ hydrate and has a formula weight of 159.60.

Other chemical compounds used have been obtained from chemical supply companies such as Aldrich Chemical Company, Inc.

Preparation of Silver (I) Imidazolate

A solution having 4.1 g (0.06 mol) of imidazole in 200 mL of tap water was added dropwise to completion into 1000 ml of a 1% by weight aqueous solution of $AgNO_3$ with constant stirring with a stir bar. Immediately a white precipitate formed. A 50% aqueous solution of sodium hydroxide was added dropwise while stirring over a period of about an hour to give a pH of 11. The white precipitate turned light brown, indicating the formation of silver oxide. The mixture was further stirred for 12 hours, during which time a colorless solid formed. The product was collected in a Büchner funnel lined with a paper filter, washed with 50 mL of tap water, then with 50 mL of methanol, and finally with 50 mL of diethyl ether. The white solid was dried for 4 hours in an oven heated at 50° C.

Preparation of Copper (II) Imidazolate

A solution containing 16 g of imidazole (0.24 mol) in 200 mL of tap water was added dropwise to 1000-mL of an aqueous solution containing 29.9 g (0.12 mol) of $CuSO_4$-hydrate with constant stirring with a stir bar. Immediately a deep blue solution was observed. A 50% aqueous solution of sodium hydroxide was added dropwise while stirring over a period of one hour to give a pH of 12. Over this time, a dark green precipitate formed. The mixture was further stirred for 2 hours and then the solid material was collected in a Büchner funnel lined with a paper filter, and washed with 50 mL tap water, then with 50 mL of methanol and, and finally with 50 mL of diethyl ether. The green precipitate was dried for 14 hours in an oven at set 50° C.

Alternative Preparation of Copper (II) Imidazolate

A 500 ml beaker was filled with tap water and stirred while adding 40 grams of CuSO4-hydrate. After stirring with a stir bar for 15 minutes, 35.83 grams of imidazole (1.2 molar excess) were added to the copper solution. After the color change to purple occurred, the solution was stirred for an additional 15 minutes. The copper-imidazole solution was filtered into a 2 liter beaker using a paper-lined glass funnel and tap water was added to fill the beaker to 1 liter. Then a 50% by weight aqueous NaOH solution was added drop wise, with continued stirring, until the pH exceeds 13 (solution was green) and then stirred for an hour. The resulting green precipitate was collected using a Büchner funnel lined with a paper filter and then washed with water. The precipitate was dried overnight at 110° C. to produce a green colored powder.

The green colored powder, described as the green modification, was analyzed using X-ray diffractometry on a Rigaku™ powder diffractometer using a cobalt rotating anode X-ray source run at 45 kV and 160 mA. Powders were prepared and run between glass slides on an aluminum holder using a transmission mode. Data was collected with a scintillation detector. The results were compared to crystal structures for the green modification of copper (II) imidazolate as described by Jarvis et al., *Acta Crystallogr.*, Vol. 13, 1027, 1960 and Inoue et al., *J. Coord. Chem.*, Vol. 6, 157, 1977. Jarvis et al. have shown that the green modification of copper (II) imidazolate possesses a structure in which there are two crystallographically non-equivalent copper atoms. Each copper atom is bonded to four nitrogen atoms to form a three-dimensional polymeric network of copper atoms linked by imidazolate molecules. The coordination geometry around one of the copper atoms is square planar while around the other copper atom the geometry adopts a distorted tetrahedral configuration. The green modification had a major peak corresponding to a repeat distance of 5.39 Angstroms, which corresponds to the crystal structure of the green modification as shown in the Jarvis reference.

Preparation of Zinc (II) Imidazolate

A solution was prepared by adding 9.5 g of imidazole (0.14 mol) to 200 mL of water while stirring with a stir bar. Then 5.8 g of sodium hydroxide were added to the imidazole solution dropwise while stirring. After complete dissolution of the sodium hydroxide, the solution was added dropwise over a 15 minute period to a stirred aqueous solution of 20 g (0.07 mol) of zinc sulfate-hexahydrate in 1000 mL of water. Immediately a white precipitate formed. Stirring continued for 3 hours with heating to 80° C. Then the solution was cooled to room temperature. The product was collected in a Büchner funnel lined with a paper filter, and washed with 50 mL of water, 50 mL of methanol and finally with 50 mL of diethyl ether. The white solid was dried for 16 hours in an oven heated at 50° C.

Preparation of Encapsulated DICY (E-DICY)

A polymer solution was prepared by adding 40 g of P(MMA-co-MAA) to 300 mL of acetone and heating to 45° C. to dissolve the acrylic polymer. A second solution was prepared by adding 30 g of DICY to 168 g of methanol. The second solution was added to the polymer solution, stirred for 1 hour, and then cooled to room temperature. The solution was processed through a Buchi™ 190 mini-spray dryer (obtained from Buchi Laboratory-Techniques Ltd., Flawil, Switzerland) to form particles of DICY encapsulated in the acrylic polymer. The spray dryer pump was set at 11, the aspirator was set at 13, the heater was set at 5, and the flow indicator was set at 400 kiloPascals. The inlet temperature was 98° C., and the outlet temperature ranged from about 58° C. to about 70° C. The encapsulated particles had an approximate size distribution between about 2–25 micrometers, and an average particle size of 5–10 micrometers. The particles contain an average of 47% by weight DICY. The encapsulated particles are referred to in the examples as E-DICY. Unless otherwise specified, all encapsulated DICY particles were made on the Buchi™ mini-spray dryer.

Preparation of Encapsulated DICY/Catechol

A polymeric solution was prepared by dissolving 40 grams of PMMA-co-PMAA in 700 ml of acetone and heating to 45° C. A second solution was prepared by adding 16 grams of DICY and 16 grams of catechol to 340 ml of methanol. The second solution was added to the first and then stirred for 1 hour at room temperature. The solution was processed through a Buchi™ 190 mini-spray dryer with conditions set as described above, to form particles that are a mixture of DICY and catechol encapsulated in the acrylic polymer. The average particle size was between about 5–10 micrometers with an overall size distribution from about 2 to about 25 micrometers. The particles contain an average of 22% by weight DICY and 22% by weight catechol based on the total particle weight.

General procedure for Epoxy Formulations

Epoxy formulations listed in Table 1 were prepared by melting the first epoxy in a 4-liter metal reaction flask in an oven at either 140° C. or 170° C. until the epoxy melted. The flask was then placed in a heating jacket being heated at about 135–140° C. and any second epoxies and additives were then added with mixing by use of an Omni™ mixer-homogenizer (Model No. 17105 available from Omni International, Waterbury, Conn.) until the components were dispersed. Then the core-shell polymer was added followed by mixing for 1–2 hours until the particles were dispersed. Finally, the fillers were added followed by mixing until all of the particles were dispersed. The compositions were then cooled to about 90–100° C. before the curatives, additional adhesion promoters and thermoplastic particulates were added followed by mixing. Optionally, the compositions could be cooled to room temperature before adding curatives, adhesion promoters, and thermoplastic particles. The compositions would then be re-heated to about 90–100° C. before the cuatives, thermoplastic particles and adhesion promoters are added.

TABLE 1

| Epoxy Formulation | EEW[1] | A | B | C | D | E |
|---|---|---|---|---|---|---|
| FIRST EPOXY | | | | | | |
| Epon ™ 1004 | 875 | 25.43 | 29.08 | | 26.23 | |
| Epon ™ 2004 | 925 | | | 31.71 | | 30.63 |
| Epon ™ 828 | 190 | | | | | |
| SECOND EPOXY | | | | | | |
| Epon ™ 836 | 312 | 9.1 | | | | |
| Epon ™ 832 | 425 | | | 16.84 | | |
| Eponex ™ 1510 | 224 | | | | 37.24 | 23.47 |
| DEN ™ 439 | 200 | 4.15 | 4.23 | 6.05 | 3.94 | 4.59 |
| Heloxy ™ 107 | 160 | 13.94 | 14.14 | | | |
| ADDITIVES | | | | | | |
| Shell ™ 58006 | 345 | 6.17 | 6.22 | | 2.95 | 6.78 |
| Hycar ™ 1300X13 | | 4.22 | 4.28 | | | 4.66 |
| Hycar ™ 1300X8 | | | | 8.71 | | |
| CORE SHELL POLYMER | | | | | | |
| EXL ™ 2600 | | 8.85 | 8.17 | 8.77 | 6.10 | 7.13 |
| Fillers | | | | | | |
| Glass Beads | | 1.45 | 1.33 | 1.44 | 0.99 | 1.15 |
| Glass Bubbles | | 0.97 | 8.87 | 0.96 | 0.67 | 0.78 |
| TS-720 silica | | 2.47 | 2.28 | 2.46 | 1.80 | 2.09 |
| Amorphous silica | | 23.25 | 21.40 | 23.06 | 16.03 | 18.72 |
| EEW of Formulation[2] | | 0.184 | 0.175 | 0.104 | 0.224 | 0.180 |

[1]EEW is the epoxy equivalent weight of the material according to the manufacturer's specifications.
[2]The "EEW of Formulation" is the sum of the equivalent weights of the reactive component epoxy resins.

Example 1

Tests 1–6 show an epoxy adhesive composition that was prepared with 100 parts by weight of Epoxy Formulation A, 9 parts by weight of encapsulated DICY, and 2 parts by weight of copper (II) imidazolate. The equivalents ratio of curative to epoxide is 1.068. The uncured compositions were copper green in color. Portions of the epoxy composition were then aged at elevated temperatures for varying times. The aging times at their respective temperatures are shown in Table 2. The compositions were also observed for any color change and reacting or hardening of the epoxy as described below. Test 7 shows an epoxy adhesive composition that was prepared with 100 parts by weight of Epoxy Formulation B, 3 parts by weight of non-encapsulated DICY, and 1 part by weight of copper (II) imidazolate. The equivalents ratio of curative to epoxide is 0.850.

After 12 hours at 80° C., the sample hardened and had an army green or olive green color.

TABLE 2

| Test | Aging Temp | Aging Time |
|---|---|---|
| 1 | Room[1] | 11 months |
| 2 | 50° C. | 98 hrs |
| 3 | 80° C. | 24 hrs |
| 4 | 100° C. | 12 hrs |
| 5 | 120° C. | 1 hr |
| 6 | 164° C. | 5 min |
| 7 | 80° C. | 12 hrs |

[1]Room temperature can vary from about 19° C. to about 23° C.

The compositions that are aged at room temperature, 50° C., and 80° C. for the times shown in Table 2 showed no color change and no hardening of the compositions. Additionally, the compositions aged at 50° C. and 80° C. and subsequently left at room temperature were stable for over 6 months after the test as evidenced by flow of the compositions in the containers as well as no noticeable change in the green color of the composition. This test shows an elevated temperature range between about 50–80° C. at which the composition is stable and can be processed using hot melt techniques without gelling or hardening.

At 100° C., the composition did not exhibit a noticeable color change, but when left at room temperature overnight after exposure to a temperature of 100° C. for 12 hours, the composition hardened. This indicated that at 100° C., a sufficient amount of the shell had softened or melted and diffused into the epoxy composition, thereby exposing the DICY to react with the copper imidazolate to allow curing of the epoxy. The cured epoxy was greenish brown in color.

At 120° C. the composition exhibited a very slight color change after 1 hour and subsequently turned an army green or olive green color. The composition had turned brown and hardened overnight.

At 164° C., the composition cured very quickly with a color change from green to army green to brown within the 5 minute period.

These tests illustrate the temperature stability of a composition of the invention at elevated temperatures for processing and storage, as well as the ability to cure rapidly at higher temperatures. Test 7, where the DICY is not encapsulated, demonstrates that such a formulation is not suitable for hot melt techniques due to the reduced stability of the catalyst system when DICY is admixed with epoxy resin and copper (II) imidazolate.

Comparative Example C1 and Examples 2–4

Epoxy compositions were prepared using 100 parts of Epoxy Formulation A, 1 part copper (II) imidazolate and encapsulated (E-DICY) in amounts shown in Table 3. Peel adhesion results are also shown in Table 3. Comparative Example C1 was consisted of 100 parts of Formulation A, 1 part copper (II) imidazolate, and 3 parts DICY with no thermoplastic polymer. Peel adhesion test results on Substrate A are shown in Table 3.

TABLE 3

| | E-DICY | Peel Adhesion | |
|---|---|---|---|
| Example | (parts) | N/cm | Failure Mode |
| C1 | 0 | 200 | ADH |
| 2 | 3.67 | 245 | COH |
| 3 | 7.33 | 250 | COH |
| 4 | 10 | 260 | COH |

The data in Table 3 illustrate the effectiveness an acrylic polymer shell to increase the peel strength of an epoxy formulation as well as to alter the failure mode from adhesive to cohesive. Example 3 was most comparable to Comparative Example C1, since Example 3 contained 3.14 weight parts of DICY and 4.19 weight parts of PMMA-co-MAA, per 100 weight parts of formulation A.

Example 5

Example 5 was prepared using 100 parts of Epoxy Formulation C, 15 parts of encapsulated DICY/catechol, 10 parts of particulate PMMA (38 K), and 1.25 part of copper (II) imidazolate. The adhesive was tested for peel adhesion on Substrate C and test results are shown in Table 4.

TABLE 4

| | Peel Adhesion | |
|---|---|---|
| Ex | N/cm | Failure mode |
| 5 | 150 | COH |

The data in Table 4 illustrate the effectiveness of adding adhesion promoters to the adhesive compositions of the invention when ionic draw lubricants are present on the substrate. Example 5 shows the utility of encapsulating catechol in the presence of DICY within a thermoplastic shell without compromising the preferred cohesive failure mode.

Comparative Example C2 and Examples 6–8

Epoxy adhesive compositions using 100 parts of Epoxy Formulation A and varying amounts of curatives and adhesion promoters as shown in Table 5. The compositions were tested for peel adhesion on Substrate A.

TABLE 5

| Ex | Copper(II) imidazolate (parts) | Zinc(II) Imidazolate (parts) | Sulfonyl diphenol (parts) | DICY (parts) | E-DICY (parts) | Peel Adhesion N/cm | Failure mode |
|---|---|---|---|---|---|---|---|
| C2 | 2 | — | — | 4 | — | 175 | ADH |
| 6 | — | 2 | — | — | 7 | 190 | COH |
| 7 | 1 | — | 3 | — | 7.33 | 210 | COH |
| 8 | 1 | — | — | — | 3.33 | 225 | COH |

The data in Table 5 show the utility of zinc (II) imidazolate as a catalyst as well as the utility of sulfonyl diphenol for increasing the bond strength to provide adhesives that have a cohesive failure mode.

Comparative Examples C3–C4 and Example 9

Comparative Example C3 and Example 9 were prepared using 100 parts of Epoxy Formulation A, 2 parts of copper (II) imidazolate and 4 parts of DICY. Comparative Example C3 contained no thermoplastic, whereas Example 9 contained 9.33 parts of encapsulated DICY which had 4 parts of DICY encapsulated with 5.33 parts of PMMA-co-MAA as equivalents is listed for each composition. The compositions were tested on various substrates including some with and without lubricants and test results are shown in Table 7.

TABLE 7

| Test Substrate | E-DICY (parts) | 0.5 part Cu(II)Imidazolate | | | 1.0 part Cu(II)Imidazolate | | | 1.5 parts Cu(II)Imidazolate | | | 2.0 parts Cu(II)Imidazolate | | |
|---|---|---|---|---|---|---|---|---|---|---|---|---|---|
| | | | Peel Adhesion | | | Peel Adhesion Failure | | | Peel Adhesion Failure | | | Peel Adhesion | |
| | | Ex | N/cm | Failure Mode | Ex | N/cm | Mode | Ex | N/cm | Mode | Ex | N/cm | Failure Mode |
| A | 0 | C5 | NS | ADH | C6 | NS | ADH | C7 | NS[1] | ADH | C8 | 175 | MIX |
| A | 3 | 10 | NS | COH | 15 | — | — | 20 | NS | COH | 25 | 170 | COH |
| A | 5 | 11 | 150 | COH | 16 | — | — | 21 | 140 | COH | 26 | — | — |
| A | 7 | 12 | — | — | 17 | — | — | 22 | 175 | COH | 27 | — | — |
| A | 9 | 13 | 185 | COH | 18 | — | — | 23 | 185 | COH | 28 | 190 | COH |
| A | 11 | 14 | 200 | COH | 19 | — | — | 24 | 175 | COH | 29 | 195 | COH |
| B | 0 | C5 | NS | ADH | C6 | 125 | ADH | C7 | NS | ADH | C8 | NS | ADH |
| B | 3 | 10 | NS | COH | 15 | NS | COH | 20 | NS | COH | 25 | 175 | COH |
| B | 5 | 11 | 165 | COH | 16 | 160 | COH | 21 | 135 | COH | 26 | 175 | COH. |
| B | 7 | 12 | — | — | 17 | 195 | COH | 22 | 185 | COH | 27 | 220 | COH |
| B | 9 | 13 | 150 | COH | 18 | 205 | COH | 23 | 175 | COH | 28 | 185 | MIX |
| B | 11 | 14 | 200 | COH | 19 | 160 | MIX | 24 | 185 | COH | 29 | 150 | COH |
| D | 0 | C5 | — | — | C6 | — | — | C7 | — | — | C8 | — | — |
| D | 3 | 10 | NS | COH | 15 | — | — | 20 | NS | COH | 25 | — | — |
| D | 5 | 11 | — | — | 16 | — | — | 21 | NS | COH | 26 | — | — |
| D | 7 | 12 | 160 | COH | 17 | — | — | 22 | 125 | COH | 27 | — | — |
| D | 9 | 13 | — | — | 18 | — | — | 23 | 150 | COH | 28 | — | — |
| D | 11 | 14 | NS | COH | 19 | — | — | 24 | 125 | COH | 29 | 125 | COH |
| E | 0 | C5 | NS | ADH | C6 | NS | ADH | C7 | NS | ADH | C8 | NS | Mix |
| E | 3 | 10 | NS | COH | 15 | NS | COH | 20 | NS | COH | 25 | 145 | COH |
| E | 5 | 11 | NS | COH | 16 | 140 | COH | 21 | 125 | COH | 26 | 160 | COH |
| E | 7 | 12 | NS | COH | 17 | 150 | COH | 22 | 150 | COH | 27 | 140 | MIX |
| E | 9 | 13 | 125 | COH | 18 | 165 | COH | 23 | 155 | COH | 28 | 125 | MIX |
| E | 11 | 14 | 145 | COH | 19 | 160 | COH | 24 | 150 | COH | 29 | 110 | COH |
| F | 0 | C5 | NS | ADH | C6 | NS | ADH | C7 | 175 | ADH | C8 | NS | ADH |
| F | 3 | 10 | 230 | COH | 15 | NS | COH | 20 | NS | COH | 25 | NS | ADH |
| F | 5 | 11 | — | — | 16 | 240 | COH | 21 | — | — | 26 | 305 | COH |
| F | 7 | 12 | 310 | COH | 17 | 300 | COH | 22 | — | — | 27 | 300 | COH |
| F | 9 | 13 | — | — | 18 | 325 | COH | 23 | 280 | COH | 28 | 310 | COH |
| F | 11 | 14 | 320 | COH | 19 | 290 | COH | 24 | — | — | 29 | 315 | COH |

[1]NS indicates that the bonds were not structural, i.e., 120 N/cm or less (based on resolution of instrument).

the capsule wall. Shear modulii (G') for these Examples are shown in Table 6, along with the value for Comparative Example C4, which was pure PMMA-co-MAA.

TABLE 6

| Ex | Shear modulus (Dynes/cm$^2$) |
|---|---|
| C3 | 9.0e08 |
| 9 | 2.1e08 |
| C4 | 8.0e09 |

The examples of Table 6 illustrate that the thermoplastic encapsulation wall material will result in plasticization of the matrix. This in turn leads to improved bond properties over formulations that do not contain thermoplastic particles, as demonstrated in other examples.

Comparative Examples C5–C8 and Examples 10–29

Epoxy adhesive compositions were prepared using 100 parts of Epoxy Formulation D and varying amounts of curatives shown in Table 7. Amounts of copper (II) imidazolate varied from 0.5 part to 2.0 parts while the encapsulated DICY (E-DICY) varied from 0 to 11 parts. The equivalents ratio (ER) of curative equivalents to epoxide The Examples in Table 7 illustrate how the peel adhesion and failure mode on different substrates can be changed by manipulating the amount of hardeners, DICY and copper (II) imidazolate, as well as the amount of thermoplastic material added as encapsulated particles with DICY in an epoxy adhesive composition.

Examples 30–31 and Comparative Examples C9–C12

An epoxy adhesive composition for Example 30 was prepared by mixing 100 parts of Epoxy Formulation D, 0.5 part of copper (II) imidazolate, and 11 parts of encapsulated DICY. An epoxy adhesive composition for Example 31 was prepared by mixing 100 parts of Epoxy Formulation E, 2 parts of copper (II) imidazolate, and 7 parts of encapsulated DICY. After mixing, the compositions were poured onto a release liner and spread with a spatula to a thickness of approximately 0.5 mm to form film adhesives. The epoxy films were tested for peel adhesion, overlap shear, and welding with and without a shunt.

Comparative Examples C9–C12 are commercially available film adhesives (hereafter identified) which include structural and non-structural adhesives. Test results are reported in Table 8.

TABLE 8

| Ex | Spot Weld Shunt | Spot Weld No Shunt | Peel Adhesion N/cm | Peel Adhesion Failure Mode | Overlap Shear N | Overlap Shear Failure Mode |
|---|---|---|---|---|---|---|
| 30 | Good | Good | 200 | COH | 15000 | COH |
| 31 | Good | Good | 200 | COH | 15000 | COH |
| C9 | Good | Failed | 180 | ADH | 14500 | ADH |
| C10 | Good | Failed | 175 | ADH | 22000 | COH |
| C11 | Good | Failed | 150 | ADH | 21000 | COH |
| C12 | Good | Failed | 175 | ADH | 22000 | ADH |

The data in Table 8 shows that only Examples 30 and 31 can be welded through without introducing a shunt.

Commercial Examples C9–C12 are identified as follows:

| | |
|---|---|
| C9 | 3M ™ AF126.03 epoxy film adhesive |
| C10 | 3M ™ AF126.06 epoxy film adhesive |
| C11 | 3M ™ AF126.08 epoxy film adhesive |
| C12 | 3M ™ AF163-40ST epoxy film adhesive |

Examples 32–37

Epoxy compositions were prepared using 100 parts of Epoxy Formulation B, 2 parts of silver imidazolate, and 5 parts of encapsulated DICY. Examples 32–37 further included varying amounts of a blowing agent (azodicarbonamide). The compositions were formed into films as described in Examples 30–31.

The examples were tested for peel adhesion. The thickness of the adhesives was also measured by approximating the increase in thickness of the films of Examples 33–37 compared to Example 32. The test results are shown in Table 9.

TABLE 9

| Example | Azodicarbonamide (parts) | Peel Adhesion N/cm | Peel Adhesion Failure Mode | Thickness Percent Increase |
|---|---|---|---|---|
| 32 | 0 | 255 | COH | 0 |
| 33 | 0.1 | 195 | COH | 125 |
| 34 | 0.2 | 165 | COH | 150 |
| 35 | 0.3 | 125 | COH | 150 |
| 36 | 0.5 | 90 | COH | 200 |
| 37 | 1 | 90 | COH | 300 |

Table 9 illustrates that on adding azodicarbonamide, an adhesive can be formulated to fill gaps. These types of adhesives can be useful when bonding substrates that are not perfectly flush or have rough surfaces. The amount of blowing agent can affect the bond strength; Examples 36–37 could be used where high peel strengths are not needed. It is also possible to encapsulate azodicarbonamide within the curative capsule, or alone, for additional stability.

Examples 38–40

Adhesive compositions were prepared using 100 parts of Epoxy Formulation A, 2 parts of copper (II) imidazolate, 7 parts of encapsulated DICY, and 5 parts of various types of acrylic polymers in particulate form having different molecular weights and glass transition temperatures as listed in Table 10. The compositions were tested for peel adhesion on Substrate A with results shown in Table 10.

TABLE 10

| Ex | Type | $M_w$ | $T_g$ | Peel Adhesion N/cm | Peel Adhesion Failure Mode |
|---|---|---|---|---|---|
| 38 | Polymethylmethacrylate | 38,000 | 114° C. | 185 | COH |
| 39 | Polymethylmethacrylate | 350,000 | 122° C. | 160 | COH |
| 40 | Polybutylmethacrylate/ methylmethacrylate[1] | 100,000 | 64° C. | 175 | COH |

[1]Polybutylmethacrylate/methylmethacrylate having monomer ratio of 1.4:1.

Examples 41–42

Epoxy adhesive compositions were prepared using 100 parts of Epoxy Formulation A, 1 part copper (II) imidazolate, and 3.33 parts of encapsulated DICY. For example 41, the adhesive was coated into a 0.5 mm thick film using a spatula as described in Examples 30–31. For Example 42, the adhesive was coated to a thickness of 0.5 mm using a hot-melt coater (model LH-1 available from Acumeter Laboratories, Inc., Marlborough, Mass.). The temperatures of the hopper and chamber were set at 100 and 105° C., respectively, and the adhesive film was coated onto a silicone coated release liner and then cooled to room temperature. The film adhesive of Example 42 was kept at room temperature for 12 months and exhibited no color change. Both adhesive films were tested for peel adhesion on Substrate A and test results are shown in Table 11. Example 42 was tested after room temperature storage for 1 day.

TABLE 11

| Example | Peel Adhesion Force (N/cm) | Peel Adhesion Failure Mode |
|---|---|---|
| 41 | 214 | COH |
| 42 | 210 | COH |

The data in Table 11 shows that the adhesives of the invention can be coated by use of a hot melt coater to form an epoxy film adhesive with essentially no loss in performance compared with a hand spread at room temperature as the values are within experimental error of each other.

What is claimed is:

1. A one-part curable epoxy adhesive composition comprising
   A. epoxy resin capable of being cured to a cured epoxy resin when exposed to an activated latent curative system;
   B. a latent curative system in an amount sufficient to cure said epoxy resin, comprising (a) at least one epoxy resin miscible first curative comprising a latent hardener, selected from dicyandiamide and its derivatives, contained substantially as a core within a multiplicity of ambient-temperature-stable, impermeable microcapsules having capsule walls comprised of a thermoplastic polymeric material and (b) at least one epoxy resin latent second curative comprising a latent accelerator which is a metal imidazolate compound of the formula:

$$ML_m$$

wherein

M is a metal selected from the group of Ag(I), Cu(I), Cu(II), Cd(II), Zn(II), Hg(II), Ni(II) and Co(II), L is an imidazolate of the formula

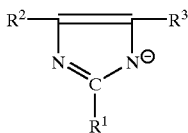

wherein $R^1$, $R^2$, and $R^3$ are selected from a hydrogen atom, an alkyl radical or aryl radical and m is the valence of M, in an amount sufficient when activated to cure said epoxy resin admixed uniformly within said curable epoxy resin, wherein the microcapsule walls isolate the first curative from the second curative.

2. A curable epoxy composition of claim 1 wherein said metal imidazolate compound is green colored copper II imidazolate.

3. The curable epoxy composition of claim 1 wherein the thermoplastic polymeric material is selected from the group consisting of polymethylmethacrylate and methylmethacrylate/methacrylic acid copolymer.

4. The epoxy adhesive composition of claim 1 wherein the thermoplastic polymeric material comprises from about 0.5% to about 30% by weight based on the total weight of the curable composition.

5. The composition according to claim 1 wherein $R^2$ and $R^3$ together comprise the atoms of an aryl radical.

6. A one-part curable epoxy sheet comprised of a composition in the shape of a sheet, said composition comprising a mixture of A. epoxy resin capable of being cured to a cured epoxy resin when exposed to an activated latent curative system;

B. a latent curative system in an amount sufficient to cure said epoxy resin comprising (a) at least one epoxy resin miscible first curative comprising a latent hardener, selected from dicyandiamide and its derivatives, contained substantially as a core within a multiplicity of ambient-temperature-stable, impermeable microcapsules having capsule walls comprised of a thermoplastic polymeric material and (b) at least one epoxy resin latent second curative comprising a latent accelerator, which is a metal imidazolate compound of the formula:

$$ML_m$$

wherein

M is a metal selected from the group of Ag(I), Cu(I), Cu(II), Cd(II), Zn(II), Hg(II), Ni(II) and Co(II), L is an imidazolate of the formula

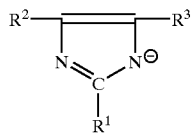

wherein $R^1$, $R^2$, and $R^3$ are selected from a hydrogen atom, an alkyl radical or aryl radical and m is the valence of M, in an amount sufficient when activated to cure said epoxy resin admixed uniformly within said curable epoxy resin, wherein the microcapsule walls isolate the first curative from the second curative, admixed uniformly within said curable epoxy resin;

C. sufficient particulate thermoplastic polymeric material having a melt flow temperature that exceeds ambient temperature and the ability to be at least partially melt blended into the epoxy resin to at least regionally plasticize the cured epoxy resin, wherein up to all of the total weight of said particulate thermoplastic polymeric material may be provided by the thermoplastic polymeric material of said microcapsule walls.

7. The curable epoxy composition of claim 6 wherein said particulate thermoplastic polymeric material and microcapsule wall thermoplastic polymeric material each comprise a polymer that has a $T_g$ of at least 60° C.

8. The curable epoxy composition of claim 6 wherein said particulate and microcapsule wall thermoplastic polymeric materials are each selected from the group consisting of polymethylmethacrylate and methylmethacrylate/methacrylic acid copolymer.

9. A curable epoxy composition according to claim 6 wherein said metal imidazolate compound is green colored copper (II) imidazolate.

10. The curable epoxy composition according to claim 6 wherein said first curative is dicyandiamide.

11. The curable composition of claim 6 wherein said metal imidazolate compound is contained in said curable adhesive composition in an amount of about 0.1 to about 10 weight percent based on the equivalent weight of the curable epoxy resin contained in said curable composition.

12. The curable composition of claim 11 wherein said metal imidazolate compound is contained in said curable adhesive composition in an amount of about 0.5 to about 3 weight percent based on the equivalent weight of the curable epoxy resin.

13. The curable composition of claim 6 further comprising up to about 40 weight percent toughener based on the total weight of the curable composition.

14. The curable composition of claim 13 wherein said toughener comprises core-shell particulate polymeric material.

15. The curable composition of claim 6 wherein said curable epoxy resin includes at least 2 epoxy groups per molecule and has a weight average molecular weight of about 150 to about 10,000.

16. The curable composition of claim 6 wherein the weight ratio of the combined equivalent weight of curative in said latent curative system to curable epoxy resin in said curable composition is in the range of about 0.3 to about 1.3.

17. The curable composition of claim 6 wherein the thermoplastic materials forming the microcapsule walls and any particulate thermoplastic material present in the composition each have a weight average molecular weight greater than about 7,000.

18. The curable composition of claim 6 wherein the microcapsules have an average particle size in the range of about 2.5 to about 250 micrometers.

19. The curable composition of claim 6 wherein said particulate thermoplastic polymeric material has a particle size of about 50 to about 250 micrometers.

20. The curable composition of claim 6 wherein catechol is also contained within said microcapsules as an adhesion promoter.

21. The one-part curable epoxy sheet of claim 6 further including a supporting structure in the sheet.

22. The one-part curable epoxy sheet of claim 21 wherein said supporting structure comprises a scrim.

23. The curable composition of claim 6 further including a blowing agent.

24. A method of making a cured epoxy composition comprising the steps of

A. providing a one-part curable epoxy composition comprising a mixture of (a) epoxy resin capable of being cured to a cured epoxy resin when exposed to an activated latent curative system; (b) a latent curative system in an amount sufficient to cure said epoxy resin comprising (i) at least one epoxy resin miscible first curative comprising a latent hardener, selected from dicyandiamide and its derivatives, contained substantially as a core within a multiplicity of ambient-temperature-stable, impermeable microcapsules having capsule walls comprised of a thermoplastic polymeric material and (ii) at least one epoxy resin latent second curative comprising a latent accelerator, which is a metal imidazolate compound of the formula:

$ML_m$ wherein

M is a metal selected from the group of Ag(I), Cu(I), Cu(II), Cd(II), Zn(II), Hg(II), Ni(II) and Co(II), L is an imidazolate of the formula

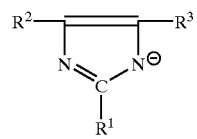

wherein $R^1$, $R^2$, and $R^3$ are selected from a hydrogen atom, an alkyl radical or aryl radical and m is the valence of M, in an amount sufficient when activated to cure said epoxy resin admixed uniformly within said curable epoxy resin, wherein the microcapsule walls isolate the first curative from the second curative, admixed uniformly within said curable epoxy resin; and (c) sufficient particulate thermoplastic polymeric material having a melt flow temperature that exceeds ambient temperature and the ability to be at least partially melt blended into the epoxy resin to at least regionally plasticize the cured epoxy resin, wherein up to all of the total weight of said particulate thermoplastic polymeric material may be provided by the thermoplastic polymeric material of said microcapsule walls; and B. heating said mixture at least to the melt flow temperature of said polymeric material.

* * * * *